United States Patent [19]
Puskorius et al.

[11] Patent Number: 5,625,750
[45] Date of Patent: Apr. 29, 1997

[54] CATALYST MONITOR WITH DIRECT PREDICTION OF HYDROCARBON CONVERSION EFFICIENCY BY DYNAMIC NEURAL NETWORKS

[75] Inventors: Gintaras V. Puskorius, Redford; Lee A. Feldkamp, Plymouth, both of Mich.

[73] Assignee: Ford Motor Company, Dearborn, Mich.

[21] Appl. No.: 267,736

[22] Filed: Jun. 29, 1994

[51] Int. Cl.$^6$ .............................. G06E 1/00; G06E 3/00; G06F 15/18
[52] U.S. Cl. .................. 395/22; 395/21; 395/20; 364/423.098; 123/672; 60/274
[58] Field of Search .................... 395/22, 23, 24, 395/903, 20–25, 27; 364/424.03, 150, 151, 577; 60/274; 123/672, 571; 382/155–159

[56] References Cited

U.S. PATENT DOCUMENTS

| | | |
|---|---|---|
| 5,095,742 | 3/1992 | James ........................................ 73/116 |
| 5,109,695 | 5/1992 | James ........................................ 73/117.3 |
| 5,247,445 | 9/1993 | Miyano ................................ 364/431.12 |
| 5,313,407 | 5/1994 | Tiernan .................................... 364/508 |

OTHER PUBLICATIONS

Feldkamp, L. A., G. V. Puskorius, L. I. Davis, Jr., and F. Yuan. "Neural Control Systems Trained by Dynamic Gradient Methods for Automotive Applications." Neural Networks Int'l. Conf. Dec. 1992.

*Primary Examiner*—Tariq R. Hafiz
*Attorney, Agent, or Firm*—Peter Abolins; Roger L. May

[57] ABSTRACT

A process and apparatus for monitoring catalyst conversion activity includes a predictor of feedgas emissions and a predictor of tailpipe emissions, each predictor providing an output for generating a ratio of conversion activity. Each predictor comprises a trained neural network receiving at least one of, and preferably a plurality of, the engine operating condition signals available from an electronic engine control. Preferably, each neural network is trained by inputting accumulated data acquired from performance evaluation of a plurality of vehicles having consistent powertrains but with different degrees of deterioration.

15 Claims, 2 Drawing Sheets

CATALYST MONITOR WITH DIRECT PREDICTION OF HYDROCARBON CONVERSION EFFICIENCY BY DYNAMIC NEURAL NETWORKS

TECHNICAL FIELD

The present invention relates generally to monitors for determining the uses of conversion activity of catalytic converters, and more particularly to a monitor performing direct prediction of feedgas pipe emissions and tailpipe emissions through neural networks in response to engine operating condition signals.

BACKGROUND ART

It has previously been known that it is possible to determine the state of deterioration of a catalytic converter by sensing parameters both before and after the catalytic converter along the exhaust path of the motor vehicle engine. The sensed values can be compared with idealized values to determine whether the sensed converter efficiency meets a predetermined standard. In such systems, air fuel sensors, often referred to as universal exhaust gas oxygen sensors (UEGO), as well as heated exhaust gas oxygen sensors (HEGO), may be used to detect the degree of catalytic converter efficiency. However, the previously known systems involve algorithms that respond to sensor inputs by reliance upon laws of physics and chemistry to calculate or model the converter activity.

Regardless of the types of sensors used in sensing components of the exhaust stream, the catalytic converters and sensors are subjected to harsh conditions which can substantially affect the working life of both and interfere with the acquisition of accurate data. Moreover, repeated cycling of heating and cooling of the internal combustion engine accelerates deterioration of the powertrain and monitoring system components. Moreover, since the sensors are subjected to a wide variety of exhaust flow conditions under the various operating conditions to which the vehicle is subjected, the information obtained from the sensors must be monitored and compared in a manner consistent with the complex variety of operating conditions to which the sensors are subjected. Accordingly, the previously known monitoring systems usually acquire data for comparison only at steady state operation of the engine.

An example of previously known attempts to monitor convertor activity by simulating the time dependent performance of an exhaust gas catalyzer is disclosed in U.S. Pat. No. 5,214,915. An air mass flow to the engine is measured and the oxygen flow represented by the air mass flow is computed. Then the deviation $\Delta\lambda$ is determined by a model with respect to the time-dependent performance of oxygen partial flows and inputting the oxygen storage capacity of the catalyzer and computing the time-dependent trace of the $\lambda$ value at the outlet of the catalyzer. The quantity of oxygen which the catalyzer can store at saturated state is dependent upon its performance loss and the partial pressure of the oxygen. Nevertheless, a forward $\lambda$ probe is mounted in the inlet pipe of the catalyzer to measure the $\lambda$ value while further $\lambda$ probe is mounted rearward of the catalyzer in the outlet pipe to measure a $\lambda$ value. However, with the previously known sensor-based systems, the system provides best results when steady state engine operating conditions are examined for comparison with desired performance standards.

SUMMARY OF THE INVENTION

The present invention overcomes the above-mentioned disadvantages by representing the complex non-linear dynamical relationships of exhaust gas emissions in a model represented by two artificial neural networks (ANN) to predict emissions. The artificial neural networks, according to the present invention, are preferably dynamic neural networks having internal feedback connections, and the circuit becomes trained, for example, by extended Kalman filter algorithms, to predict a result that is based on engine operating parameters without calculating or modeling actual physical or chemical relationships of the exhaust gas components. The predictions are employed to gauge the deterioration of converter activity over time.

In the preferred embodiment, neural network models are trained by data gathered for a representative number of vehicles and driving conditions. For example, data can be acquired on a computer-controlled, chassis-rolls dynamometer equipped with a data acquisition system of the type used for monitoring electronic engine control (EEC) variables. For example, two real-time emission benches for measuring feedgas and tailpipe emissions may be used to acquire data, as the vehicle is driven through representative drive cycles in both transient and steady state conditions.

After a representative sets of data have been acquired, neural networks are trained off-line to predict the feedgas and the tailpipe emissions. Preferably, both the feedgas emission prediction and the tailpipe emission prediction are provided by the neural networks. Each of the trained neural networks is then provided with at least one engine operating condition signal input, and preferably a plurality of input signals readily available from the electronic engine control. Preferably, the feedgas prediction network provides a signal that joins the inputs of measured engine speed, vehicle speed, mass air flow, EGO sensor output of the sensor positioned before the catalyst, and the control signal inputs such as requested fuel, exhaust gas recirculation, and spark advance inputs, as an input to the tailpipe emission prediction network. The parameters of the dynamic neural networks are fixed and stored in read only memory as desired, for example in software or embedded in dedicated neural network hardware chips to provide on-board vehicle monitoring.

As a result, the present invention provides a method for monitoring catalytic converter activity comprising inputting a plurality of engine operating condition signals, predicting a first level emissions at a feedpipe entering the converter in response to a set of engine operating condition signals, predicting a second level of emissions at a tailpipe exiting the converter in response to a second set of engine operating condition signals and comparing the predicted level or ratio of the levels of tailpipe emissions and the feedpipe emissions with preselected level or ratio values.

Moreover, the process of the present invention provides a method for directly predicting the catalytic converter activity by determining a ratio of predicted tailpipe emissions to predicted feedgas emissions. The efficiency of the converter may also be formally established by subtracting the ratio from one.

Moreover, the present invention provides a process including training neural networks including internal feedback connections by inputting a plurality of engine operating condition parameters including sensed and demand signals, and acquiring data throughout a wide variety of engine operating conditions.

In addition, the present invention includes a process of inputting the feedgas neural network prediction into the tailpipe prediction neural network to derive a ratio of tailpipe emissions to feedgas emissions for the purpose of comparison with a predetermined ratio or standard.

The present invention also provides an onboard monitor for checking compliance with hydrocarbon conversion efficiency levels including trained neural network predictors generating a direct prediction of feedgas emissions and tailpipe emissions as a result of existing engine operating condition signals including sensor outputs and command outputs.

BRIEF DESCRIPTION OF THE DRAWING

The present invention will be more clearly understood by reference to the following detailed description of a preferred embodiment when read in conjunction with the accompanying drawing in which like reference characters refer to like parts throughout the views and in which.

DETAILED DESCRIPTION OF THE PREFERRED EMBODIMENT

Figure 1:
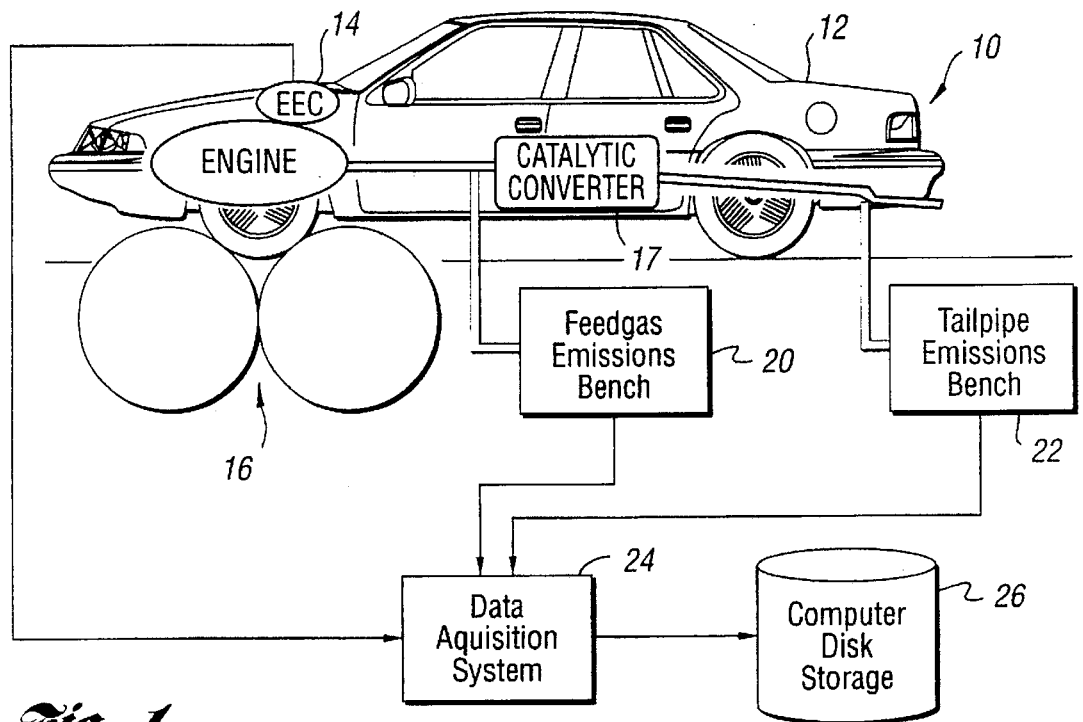
FIG. 1 represents a system for accumulating data for training neural networks according to the process of the present invention.

Referring first to FIG. 1, a system 10 for acquiring accumulated data to train a neural network comprises at least one and preferably a plurality of vehicles 12. Each of the vehicles preferably is from the same class or model of vehicle having similar or identical powertrains with different conditions of deterioration to account for in-use variability. As is well known, each vehicle 12 has an engine driven by incorporating an electronic engine control (EEC) 14 having signals representative of engine operating conditions and driver demands. As used herein, the term EEC is to be understood as referring to any processor-based motor vehicle operating control involved with engine operation, including such expanded vehicle systems such as powertrain control modules (PCM).

These condition representative signals from the EEC and command signals are detected as the vehicle is driven through a representative drive cycle, for example, a Federal Test Procedure (FTP) cycle, that has both transient and steady state conditions on a computer-controlled, chassis-rolls dynamometer 16 equipped with a data acquisition system for monitoring EEC variables such as engine speed, mass air flow and EGO sensor signals. In particular, two real-time emission benches 20 and 22 measure the feedgas emissions and tailpipe emissions, respectively, of the tested vehicles. A data acquisition system 24 monitors the numerous engine operating condition signals available from the electronic engine control 14 as well as the data input from the feedgas emissions bench 20 and the tailpipe emissions bench 22. Preferably, data acquired by the system 24 can be stored as necessary as diagrammatically indicated at 26 for training of neural networks as will be discussed in greater detail below.

With the setup described above, each vehicle 12 is driven through a representative drive cycle. For example, an FTP cycle that has both transient and steady state operating conditions of the vehicle. The computer-based data acquisition system, preferably a PC that employs digital signal processing ports, analog-to-digital (A–D) converters, and storage space such as disk space, measures the variables that are available to the electronic engine control 14. Typically, these variables include but are not limited to sensor signals such as engine speed, mass air flow, vehicle speed, engine coolant temperature, outputs of available EGO sensors, primarily EGO sensors positioned upstream of the catalytic converter, and a throttle position sensor, and operating controls or commands that may affect emissions such as fuel requested, the degree of exhaust gas recirculation employed and the spark advance operating conditions. These variables can be measured at regular intervals in time, for example at a 50 Hz sampling rate, or can be obtained synchronously with engine events, for example, a sample rate proportional to engine speed.

The emissions benches 20 and 22 are well adapted as is known in the art to measure masses of the relevant emissions constituents such as hydrocarbons (HC), carbon monoxide (CO), and oxides of nitrogen (NOx), for both feedgas and tailpipe emissions. The measured emissions are also preferably obtained at regular temporal intervals, for example a 1 Hz sampling rate, which are typically longer than the intervals at which the signals from the electronic engine control 14 are measured. The acquired data is archived to computer files for post-processing including neural network training and data integrity checking by graphic display or statistical packaging preparation.

Preferably, a number of vehicles 12 are separately tested to gather data, the vehicles preferably being from the same class but with different conditions of deterioration to account for in-use variability of the engine operating condition signals. Moreover, to improve on the predictions for catalyst monitoring based on the engine operating condition signals, it is important to acquire data for a number of vehicles with catalysts of different average emission conversion efficiencies, and the vehicles 12 will be selected accordingly.

Figure 2:
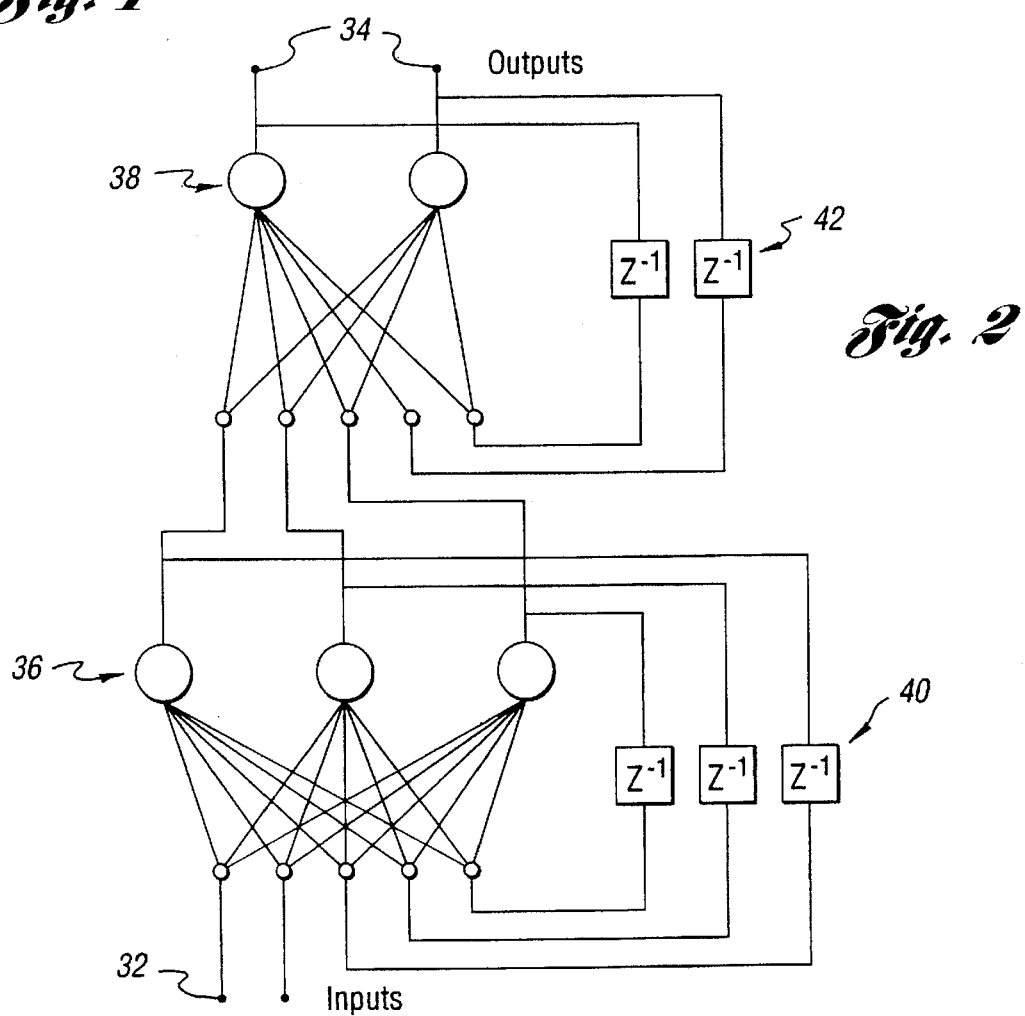
FIG. 2 is a diagrammatic view of an exemplary portion of a neural network structure to be trained with the data acquired according to the system of FIG. 1.

Referring now to FIG. 2, a sample neural network 30 is thereshown comprising a pair of inputs 32 and a pair of outputs 34. Each neural network includes at least one layer 36 of nodes, although as shown in FIG. 2, at least two layers 36 and 38 of nodes are interconnected between the inputs 32 and outputs 34 in the preferred embodiment. A connection is made between each input and each node in the neural network, and the number of nodes in the neural network is chosen experimentally to provide good predictions, but starting with a small number of nodes.

Preferably, an increased number of nodes in each layer 36 and 38 permits an appropriate feedback 40 and 42, respectively, to be input to the layer of nodes in order to train the neural network. The output from each node in the layer 36 is input to a node in the second layer 38.

The artificial neural networks are trained by representative data sequences that relate a system's outputs to its inputs. The dynamic neural networks are trained as models of both the emission forming process, as measured in the feedgas exhaust of an engine at 20, and the process of emissions reduction and oxidation by the three-way catalyst, as measured at the tailpipe emissions bench 22. Causal relationships between engine operation and vehicle variables that are available at the electronic engine control 14, and the amount of emissions that are produced in both the feedgas and tailpipe exhaust streams, are learned and represented by the dynamic neural networks 44 and 46, artificial neural networks that have internal feedback connections, trained by appropriate procedures such as extended Kalman filter algorithms or others as prescribed. As a result, the trained neural networks 44 and 46 provide predictions that result from inputting numerous data from electronic engine control 14 based on the data from the emissions benches 20 and 22 that had been stored at 26 and then input to a neural network such as that shown in FIG. 2. Such trained artificial neural networks 44 and 46 are then used to directly predict a catalytic converter's average emissions conversion efficiency in response to the inputs delivered regarding engine operating condition signals from the electronic engine control 14 and from operator actuated variables. The first layer of feedbacks 40 at the node layer 36 and second layer of feedback processes 42 at node layer 38 preferably form dynamic neural networks for the feedgas emission prediction and tailpipe emission prediction according to the present invention.

Figure 3:
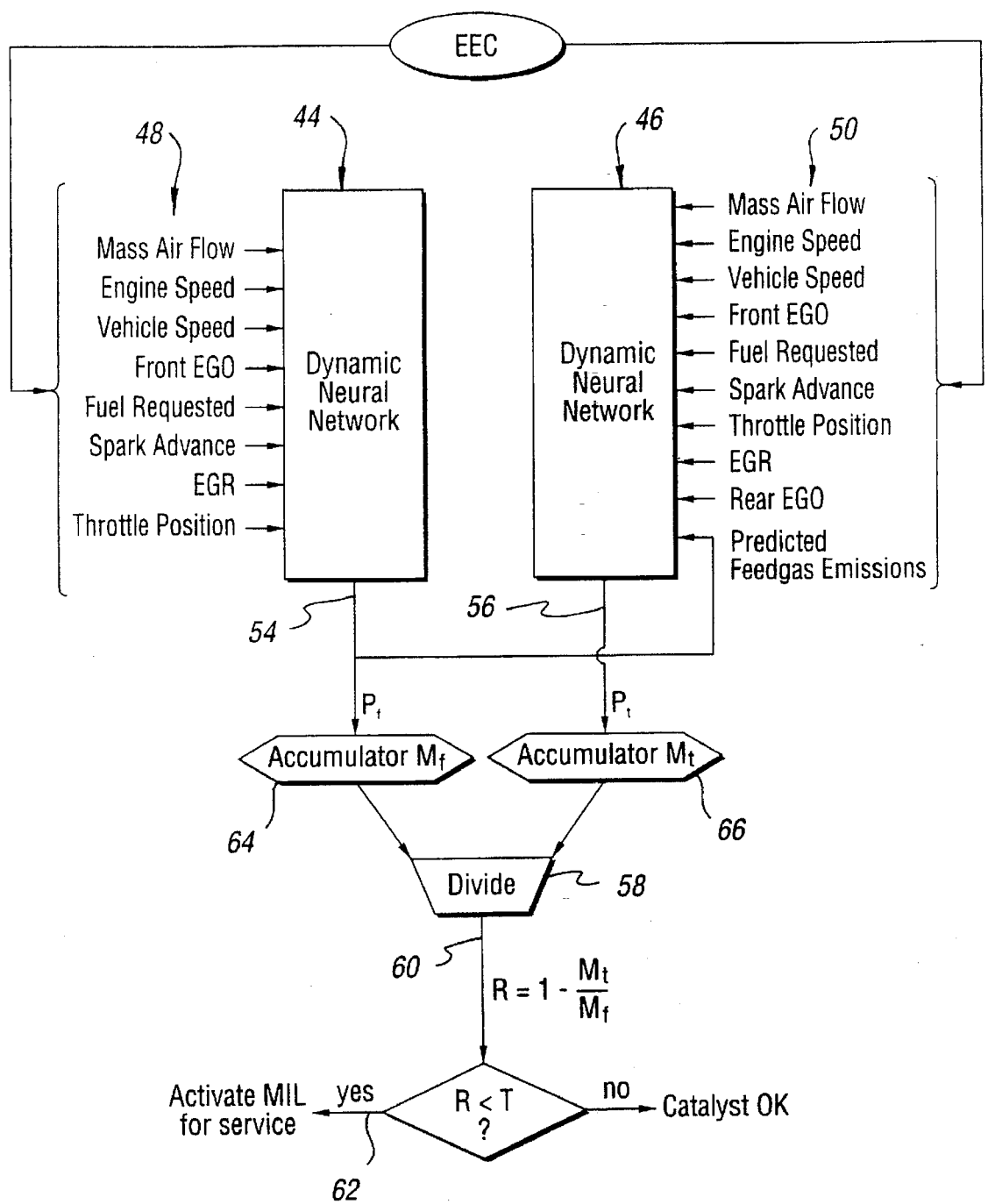
FIG. 3 is a diagrammatical chart representation of the monitoring system according to the present invention utilizing direct prediction of feedpipe emissions and tailpipe emissions resulting from a neural network trained in accordance with FIGS. 1 and 2.

Referring now to FIG. 3, a process of monitoring catalyst conversion efficiency is shown diagrammatically representing all inputs of engine operating condition signals as available from the EEC 14. A first dynamic neural network 44, preferably of the type shown in FIG. 2, receives the input signals representing mass air flow, engine speed, vehicle speed, front EGO (exhaust gas oxygen), throttle position, fuel requested, spark advance, and EGR. This first set 48 of inputs to the trained neural network 44 with output 34 comprises a prediction of feedgas pipe emissions upstream of the catalytic converter 17. In a similar manner, a second set 50 of engine operating condition signals, preferably inputs included in the set of engine operating condition signals 48 as well as a rear EGO sensor signal and a signal 54 from the predicted feedgas emissions output $P_f$ from the neural network 44. These inputs to the dynamic neural network 46 result in a tailpipe emissions prediction $P_t$. The predictions $P_f$ and $P_t$ are then accumulated in memory such as EEC memory locations to provide a ratio of feedgas emission prediction to tailpipe emission prediction.

While the ratio may itself provide an indication of the performance of the catalytic converter, it will be appreciated that the activity may be expressed as efficiency by the difference of one minus the ratio. Preferably, the ratio of averaged accumulated feedgas emission predictions $M_f$ at 64 and tailpipe emission predictions $M_t$ at 66 is used.

Training of a neural network is performed by providing a sequence of input signals to the network, for example the sets 48 and 50 discussed above. From the accumulated records at 26, actual inputs from the vehicle on which the neural networks are then installed are sequentially fed into the networks 44 and 46 to produce the predictions $P_f$ and $P_t$, typically expressed in a weight such as grams. After training, the parameters of the dynamic neural networks 44 and 46 fixed and stored in some form of read only memory form the predictors 44 and 46, respectively. Trained networks can be used as input/output models executed in software or can be embedded into dedicated neural network hardware chips.

Having thus described important structural features of the present invention, it will be understood that catalyst monitoring according to the present invention computes average, catalyst conversion efficiency once the networks 44 and 46 have been trained to predict an amount of emissions, for example, HC content, in the feedgas and tailpipe exhaust as a function of the engine operating condition signals input for example the set 48, the feedgas prediction network predicts the amount $P_f$ of HC emissions in the feedgas upstream of the catalytic converter 17 at regular intervals of time.

This prediction $P_f$ is accumulated into the variable $M_f$, preferably a very slowly leaking average of predictions $P_f$ covering more recent time spans such as the last 20 minutes of operation. As a function of the second set 50 of engine operating condition signals, the tailpipe prediction network 46 predicts the amount of HC emissions $P_t$ in the tailpipe downstream of the catalytic converter at regular intervals of time. This prediction $P_t$ is accumulated into the variable $M_t$, preferably a slowly leaking average of $P_t$. The leaking average predicted average catalyst HC conversion may be readily determined as $1-M_t/M_f$. The catalyst is considered to be operating properly and in an acceptable condition if the prediction of HC conversion efficiency over a representative drive cycle, for example, a drive cycle that contains the same driving modes as experienced during a federal test procedure (FTP) cycle, is above some selected or calibrated threshold. If the prediction of conversion efficiency falls below the threshold, the catalyst is considered to be malfunctioning.

In response to a prediction indicative of malfunctioning, a malfunction indicator such as a malfunction indicator light (MIL) may be actuated by the EEC, or the indicator may store an error code in memory for future processing such as testing by a technician during licensing or regulated inspection to see if an error code is set. In any event, such predictions enable the motor vehicle to include diagnostic strategy which monitors the catalytic converter by direct prediction of HC conversion efficiency in comparison with the efficiency requirements of standards that may be set by regulatory organizations.

In any event, the present invention provides a process for monitoring a catalyst conversion and rating its efficiency as a function of the predicted feedgas and tailpipe emissions.

In addition, the present invention has a means for training the predictors by training a neural network with accumulated data from engine operating condition signals and predictions resulting from a set of engine operating condition signals. Training occurs by inputting engine operating condition signals through neural networks employing nodes having a minimum number, but preferably a multiple of nodes, as well as having internal feedback connections to the nodes.

Having thus described the present invention, many modifications thereto will become apparent to those skilled in the art to which it pertains without departing from the scope and spirit of the present invention as defined in the appended claims.

What is claimed is:

1. A process for monitoring catalytic converter activity comprising:

training a first neural network to predict feedgas emissions from a plurality of signals derived from an electronic engine control module by sensing emission constituents under dynamic conditions;

training a second neural network to predict tailpipe emissions from a plurality of signals derived from an electronic engine control module by sensing emission constituents under dynamic conditions;

predicting feedgas emissions at said first trained neural network by inputting a first set of a plurality of engine operating condition signals to said first neural network;

predicting tailpipe emissions at said second trained neural network by inputting a second set of said plurality of engine operating condition signals to said second neural network;

predicting catalyst conversion activity by determining the ratio of feedgas emission predictions to tailpipe emission predictions; and indicating when said predicted catalytic converter activity is below a predetermined level.

2. The invention as defined in claim 1 wherein said training steps comprise:

accumulating a plurality of feedgas emissions measurements and accumulating a plurality of tailpipe emissions measurements; and determining average catalyst conversion activity by determining the ratio of accumulated feedgas emissions measurements to accumulated tailpipe emissions measurements.

3. The invention as defined in claim 1 wherein said training a first neural network step comprises modeling a prediction of feedgas emissions by accumulating a plurality of measured feedgas emission outputs from a plurality of vehicle operating cycles.

4. The invention as defined in claim 3 wherein said training step comprises accumulating a plurality of measured emission outputs from a plurality of vehicles.

5. The invention as defined in claim 1 wherein said first plurality of engine operating condition signals comprises at least two signals taken from the group consisting of mass air flow signal, engine speed signal, front EGO signal, vehicle speed signal, fuel requested signal, spark advance signal, and EGR signal.

6. The invention as defined in claim 1 wherein training said second neural network step comprises modeling a prediction of tailpipe emissions by accumulating a plurality of measured tailpipe emission outputs from a plurality of vehicle operating cycles.

7. The invention as defined in claim 6 wherein said training step comprises accumulating a plurality of measured tailpipe emission outputs from a plurality of vehicles.

8. The invention as defined in claim 1 wherein said second plurality of engine operating condition signals comprises at least two signals taken from the group consisting of mass air flow signal, engine speed signal, front EGO signal, vehicle speed signal, fuel requested signal, spark advance signal, EGR signal, rear EGO sensor and predicted feedgas emissions.

9. The invention as defined in claim 1 wherein at least one neural network is a recursive neural network.

10. The invention as defined in claim 1 wherein each neural network is a recursive neural network.

11. A monitor for monitoring compliance with hydrocarbon conversion activity levels of an internal combustion engine having an electronic engine control with a plurality of engine operating condition signals, comprising:

a first plurality of said engine operating condition signals;

a second plurality of said engine operating condition signals;

a first trained neural network predictor generating a feedgas emission constituent prediction signal in sensed response to said first plurality of engine operating condition signals;

a second trained neural network predictor generating a tailpipe emission constituent prediction signal in sensed response to said second plurality of engine operating condition signals;

a comparator for determining compliance of a ratio of said feedgas emission prediction to said tailpipe emission prediction with a predetermined ratio standard for said predictions; and an indicator for advising of a failure to detect compliance in response to said ratio comparator.

12. The invention as defined in claim 11 wherein said second plurality of engine operating condition signals includes said feedgas emission constituent prediction.

13. A process for monitoring catalytic converter activity comprising:

inputting a plurality of engine operating condition signals;

predicting a first level of emissions at a feedgas pipe entering the converter in response to inputting a first set of said plurality of engine operating condition signals through a dynamically trained neural network;

predicting a second level of emissions at a tailpipe exiting the converter in response to inputting a second set of said plurality of engine operating condition signals through a dynamically trained neural network;

comparing the predicted first and second levels of emission predictions to determine a ratio of the tailpipe emission prediction to the feedgas pipe emission prediction; and indicating the activity of said catalyst by signaling in response to a determined ratio of predictions greater than a predetermined ratio.

14. The invention as defined in claim 13 wherein said predicting a first level comprises inputting said first set of engine operating condition signals to a trained neural network.

15. The invention as defined in claim 13 wherein said predicting a second level comprises inputting said second set of engine operating condition signals to a trained neural network.

* * * * *